March 6, 1962 W. D. WURDACK 3,024,011
CENTRIPETAL DISPERSER
Filed Aug. 14, 1958
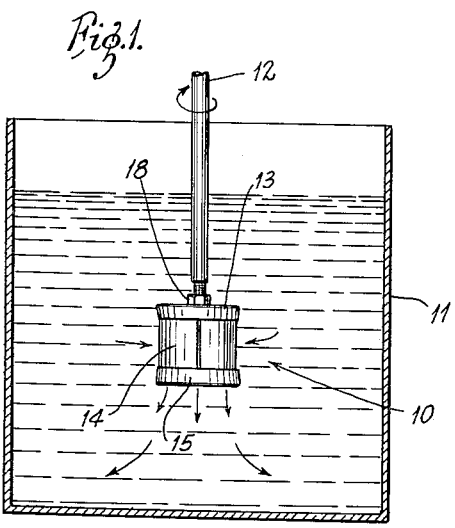
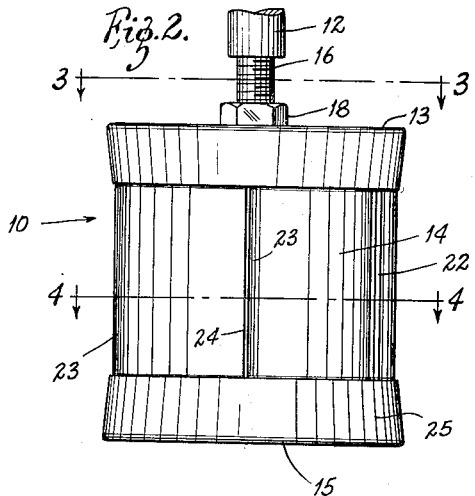
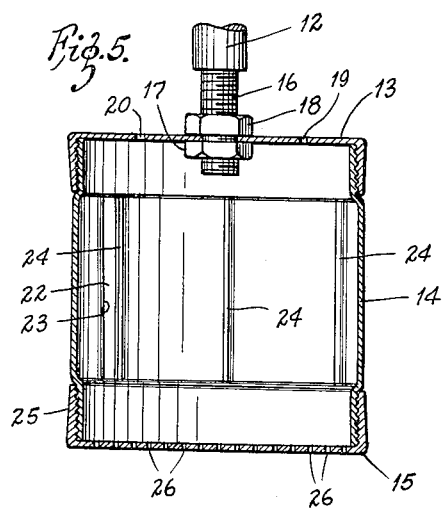
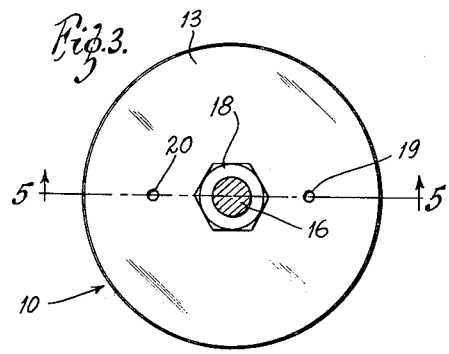
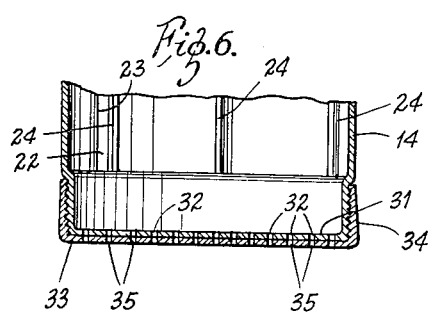
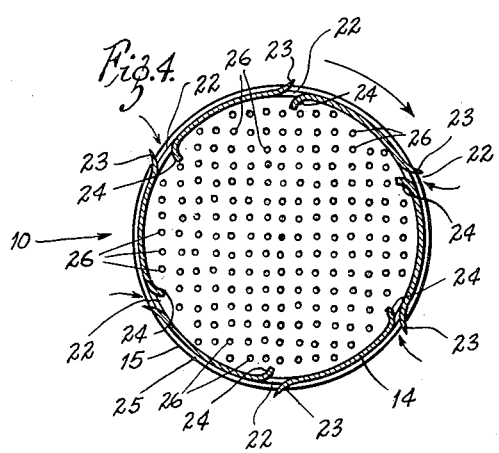
INVENTOR:
WILLIAM D. WURDACK,
By Kingsland, Rogers & Ezell
ATTORNEYS 3,024,011
CENTRIPETAL DISPERSER
William D. Wurdack, 107 Cornelia Ave., St. Louis 22, Mo.
Filed Aug. 14, 1958, Ser. No. 754,984
2 Claims. (Cl. 259—134)

This invention relates to improvements in dispersing devices and, in particular, is concerned with a centripetal dispersing apparatus which may be used in fluids to mix and disperse solid components or viscous fluids with other fluids in fluid mixtures.

In the past, many and various types of devices have been employed for the accomplishment of mixing and dispersing of solids and viscous fluids into fluid mixtures, and the problem of proper dispersion has been a particularly important one in the paint and allied industries. It is a well known problem that in mixing paints and other types of mixtures which contain solids or viscous fluids, there is a tendency of the solids and the heavier fluids to settle to the bottom in the form of a sludge and the like. For proper utilization of the mixture, there should be a uniform dispersion and viscosity throughout the entire fluid as is obvious. Such dispersion should include the breakdown of any agglomerated particles to insure a uniformly small particle size of the suspended solids.

By means of this invention there has been provided a very simply constructed but highly efficient dispersing device which may be used in a conventional fluid container to disperse and mix solids and viscous fluids in fluid mixtures. In its simplest form the disperser of this invention acts as a centripetal disperser employing a cylindrical cage element which has axial ports on the shell with outwardly extending baffles which tend to catch and force the fluid mixture within which the device is immersed into the interior of the cage under high pressure and expel it through small openings at the bottom of the cage. The effective area of the outlet openings at the bottom of the cage is less than the effective inlet port area on the shell of the cage and in this manner a pressure differential is established by means of which solid particles or viscous fluids are tended to be extruded or forced through the outlet openings. There is a combined action in the centripetal disperser which operates very effectively to provide for circulation of the fluid within the container where the centripetal disperser is immersed and at the same time provide for proper breakdown of solid particles to the proper size as they are expelled through the outlet openings of the disperser device.

The centripetal disperser of this invention is very rugged in nature and can be simply employed in a variety of applications where fluids are desired to be mixed and uniformly dispersed. The device may be very efficiently employed by relatively unskilled workmen, since the only major criterion is the immersion of the device under the surface level of the fluid mixture to be mixed and dispersed and then operating the device at high speeds until the proper mixing and dispersing is effected. The entire device rotates as a unit and there are no relatively moving components that are subject to disrepair or misalignment or the like. Proper control of the mixing and dispersing may be effected by varying the speed of the device or the ratio of the inlet ports to the outlet ports with relation to their respective areas. It will be understood that varying sizes of outlet openings may be employed for different applications and the adaptability and simplicity of the centripetal disperser will be readily apparent.

It is accordingly a primary object of this invention to provide a disperser for proper mixing and dispersion of fluid mixtures employing a rotary shell having outlet openings around the sides with baffles protruding therefrom to force the fluid mixture into the interior of the shell and expel the same under pressure through outlet openings at the bottom thereof.

Another object of this invention is to provide an apparatus for dispersion of fluid mixtures with solids or viscous fluids contained therein in which a rotary cage may be immersed in a fluid and in which the cage is provided with a plurality of openings around the periphery of the shell with outwardly protruding baffles situated to force liquid into the interior of the shell and in which an outlet plate is provided perpendicular to the axis of rotation in which the outlet openings are small in size to provide for the proper dispersing.

It is another object of this invention to provide an apparatus for mixing and dispersing of fluids in which a centripetal disperser device is immersed in a container filled with liquid, said container being immersed below the surface level of the liquid in spaced relation to the bottom of the container, and in which the centripetal disperser device is provided with a rotary shell having a plurality of inlet ports with baffle means for forcing liquid from the container into the interior of the shell and through small outlet ports whose combined area is less than that of the inlet ports, said outlet ports being located in a member disposed substantially perpendicular to the axis of rotation of the shell.

Still a further object of this invention is to provide a centripetal disperser device for dispersing and mixing of fluids employing a very simply yet rugged constructed shell having inlet ports disposed around the axis of the shell and outlet ports of less total area than the inlet ports and disposed in a member substantially perpendicular to the axis of the shell, and in which the device may be very simply employed by merely inserting it in a container where the fluid is to be mixed and operating it at high rotational speeds.

Further objects of this invention will appear in the detailed description which follows and will be further apparent to those skilled in the art.

For the purpose of illustration, there is shown in the accompanying drawing a preferred embodiment. It is to be understood that these drawings are for the purpose of example only, however, and that the invention is not limited thereto.

In the drawings:

FIGURE 1 is a view in elevation taken through a vertical section of a container filled with fluid and showing the centripetal disperser device therein;

FIGURE 2 is an enlarged view in elevation of the centripetal disperser;

FIGURE 3 is a horizontal view in section taken on the line 3—3 of FIGURE 2 showing the top of the disperser and its connection to a rotary shaft;

FIGURE 4 is a horizontal view in section taken on the line 4—4 of FIGURE 2 showing the construction of the inlet ports and the outlet openings;

FIGURE 5 is a view in section taken on the line 5—5 of FIGURE 3 showing the cage or shell construction of the disperser device; and FIGURE 6 is a fragmentary view in vertical section taken through the axis of the disperser device and showing the bottom thereof and a modified construction of the outlet ports whereby the effective individual opening sizes may be varied.

In FIGURE 1 the centripetal disperser identified by the numeral 10 is shown beneath the surface level of a fluid mixture to be mixed and dispersed contained in a container 11. The top of the centripetal disperser is connected to a shaft 12 which is rotated in the direction of the arrow. It will be understood that the shaft is connected to a motor or other prime mover for rapid rotation of the disperser at speeds up to several thousand r.p.m.

As best shown in FIGURES 2 through 5, the centripetal disperser is in the form of a cylindrical cage having a top 13, a shell 14, and a bottom 15. The top is threadably received at the top portion of the shell 14 or may be press-fitted thereto. The shaft is connected to the top 13 by the insertion of a threaded end 16 of the shaft through an opening in the top and locking nuts 17 and 18 on either side of the top. Bleed holes 19 and 20 are provided for the escape of any trapped air within the disperser.

The shell 14 is best shown in FIGURES 2, 4, and 5. It is in the form of a short open tube or cylinder, the top and bottom portions of which are threaded to receive the top 13 and the bottom 15. A plurality of inlet ports, generally designated by the reference numeral 22, are provided around the periphery of the shell. These ports extend axially and are simply formed by an axial cut on the shell. Then a baffle portion 23 is formed which protrudes beyond the radius of the shell so that when the shell is rotated in the direction of the arrow shown in FIGURE 4 liquid will be caused to be forced through the port 22. At the side of the slot opposite the baffle 23, there is an inwardly projecting flange 24 which serves to deflect fluid from the interior walls of the shell and prevent eddy currents or dead spaces therealong. The baffle 23 and the deflecting member 24 are very simply formed by making an axial cut on the shell and then shaping the members 23 and 24 in opposite directions as shown without the requirement of any added structure or complicated connection of any sort.

The bottom 15, as shown in FIGURES 4 and 5, has a rim portion 25 which is threaded to the bottom of the shell in much the same fashion as the top 13 is threaded to the top of the shell. The bottom is provided with a large number of small openings 26 which may be formed by drill holes through the bottom. If desired, the top of these holes may be countersunk to prevent clogging of the holes. The combined area of all of the openings 26 is such that the ratio of the total area is less than the total inlet area of the multiple inlet ports 22. The range of the ratio of the total area of the inlet ports to the total area of the outlet openings may be in the order of about one and one-half to one up to as much as ten to one with varying ratios being suitable for the processing of various types of fluid mixtures as will be obvious to those skilled in the art.

In FIGURE 6 a modified form of the bottom structure is shown. In this structure the shell 14 has the bottom formed integrally with it, said bottom being designated by the numeral 31 and the openings by the numeral 32. An outlet opening adjustment member 33 is provided which has a rim 34 that fits in threaded or other type of rotatable relation with the lower part of the shell as shown. The adjustment member 33 is provided with a plurality of openings 35 with the openings 35 being adapted to be in full registry with the openings 32. It will be seen that by partial rotational adjustment of the adjustment member 33 with respect to the bottom 31 that the registry of the openings 32 and 35 can be changed, thus varying the effective size of the outlet opening. In this manner the effective area of the openings can be varied and also the effective ratio of the inlet port openings 22 to the outlet openings can thereby be adjusted to provide for varying conditions of operation in handling of different types of mixtures.

*Use*

The centripetal disperser of this invention is very simply adapted to be used by implacement within a container 11 as shown in FIGURE 1 and then rotating the shaft 12. When the disperser is so placed, as for example, in a paint mixture which is desired to be mixed with solid pigments to be dispersed, the disperser is rotated in the direction of the arrows shown in FIGURES 1 and 4. The baffle member, because of its protrusion beyond the periphery of the shell into the path of rotation, will cause the fluid mixture to be forced through the ports 22 into the interior of the disperser. At the outset of operation when the disperser is placed beneath the surface level and at the start of rotation, any entrapped air will be forced outwardly through the bleed holes 19 and 20. As operation is continued, a high pressure will be established within the interior of the shell and the fluid mixture will be forced and expelled through the outlet openings 26. Because of the force applied, the fluid mixture will be broken down and any agglomerated particles or viscous liquids will be dispersed when they are expelled from the bottom of the disperser as shown in FIGURE 1 and efficiently mixed with the fluid.

It will further be seen that as the device is operated as shown in FIGURE 1 and when spaced from the bottom of the container, there is an effective circulation within the fluid mixture of the container so that efficient mixing is accomplished. It will also be apparent that various parts of the container may be reached with the mixer where desired by raising or lowering the dispenser or moving it from side to side.

To provide different conditions of operation for handling of different types of fluid mixtures, it may be desirable to provide larger or smaller sized outlet openings and to vary the effective area ratio of the inlet ports to these outlet openings. This may be provided by either using a bottom member 15 with different size openings 26, or the adjustment members 31 and 33 of FIGURE 6 may be used. In the embodiment of FIGURE 6 the adjustment member 33 may be partially rotated with respect to the bottom member 31 to vary the effective area and size of the outlet openings 32.

It will be apparent from the foregoing description that a very simply constructed centripetal disperser has been provided by this invention. The disperser is simple and rugged in construction and extremely easy to operate by relatively unskilled personnel, and has provided a substantial advance in the art of mixing and dispersing of various types of fluids and solids. Although the application of the disperser has been described with respect to the mixing of paints, it will be obvious that it can be used broadly in the field of liquid and solid mixing and dispersing and is, of course, not limited thereto.

Various changes and modifications may be made in the centripetal disperser of this invention as will be obvious to those skilled in the art. Such changes and modifications are within the scope and teaching of this invention as defined by the claims appended hereto.

What is claimed is:

1. A dispersing device for mixing fluids and solids comprising a hollow shell-like housing having two opposed ends, a first end of which is closed, means for rotating the housing about an axis of the housing, and means for forcing fluid into the interior of the housing under pressure and expelling it therefrom through the second end of the housing provided with small outlet openings to disperse and mix the fluid, said last named means including baffle means disposed on the sides of the housing and extending outwardly of said housing toward the direction of rotation for forcing fluid from the exterior of the housing through inlet ports provided in the side of the housing into the interior thereof, said inlet ports having a greater combined effective area than the combined area of said outlet openings, and deflecting means extending inwardly from and terminating a short distance from the inner wall in the interior of said housing for deflecting liquid away from the inner wall thereof.

2. A dispersing device for mixing fluids and solids comprising a hollow shell-like housing having two opposed ends, a first end of which is closed, means for rotating the housing about an axis of the housing, and means for forcing fluid into the interior of the housing under pressure and expelling it therefrom through the second end of the housing provided with small outlet openings to disperse and mix the fluid, said last named means including baffle means disposed on the sides of the housing and extending outwardly of said housing toward the direction of rotation for forcing fluid from the exterior of the housing through inlet ports provided in the side of the housing into the interior thereof, said inlet ports having a greater combined effective area than the combined area of said outlet openings, and means for varying the ratio of the inlet ports to the outlet openings, said means comprising means for varying the effective size of the outlet openings including a member provided with openings movable into and out of registry with said outlet openings, and deflecting means extending inwardly from and terminating a short distance from the inner wall in the interior of said housing for deflecting liquid away from the inner wall thereof.

References Cited in the file of this patent

UNITED STATES PATENTS

| | | |
|---|---|---|
| 141,709 | Fuqua | Aug. 12, 1873 |
| 355,329 | Le Blanc | Jan. 4, 1887 |
| 1,040,664 | Griffith et al. | Oct. 8, 1912 |
| 1,353,425 | Schlappi | Sept. 21, 1920 |
| 2,244,815 | Underwood | June 10, 1941 |
| 2,578,805 | Johnson | Dec. 18, 1951 |

FOREIGN PATENTS

| | | |
|---|---|---|
| 664,464 | Great Britain | Jan. 9, 1952 |
| 20,532 | Switzerland | Oct. 31, 1899 |